United States Patent [19]

Tanaka

[11] Patent Number: 4,579,189

[45] Date of Patent: Apr. 1, 1986

[54] TWO-WHEELED MOTOR VEHICLE ANTI-LIFT DEVICE

[75] Inventor: Osami Tanaka, Kamifukuoka, Japan

[73] Assignee: Honda Giken Kogyo Kabushiki Kaisha, Tokyo, Japan

[21] Appl. No.: 536,407

[22] Filed: Sep. 27, 1983

[30] Foreign Application Priority Data

Sep. 28, 1982 [JP] Japan .................. 57-170161

[51] Int. Cl.⁴ .................................. B62K 25/04
[52] U.S. Cl. ............................. 180/227; 188/272; 280/276; 280/703
[58] Field of Search ........... 180/227; 280/701, 703, 280/724, 725, 284, 285, 690, 276, 688; 188/272

[56] References Cited

U.S. PATENT DOCUMENTS

| | | | |
|---|---|---|---|
| 2,289,907 | 7/1942 | Friedlaender | 280/703 X |
| 2,354,219 | 7/1944 | Newton et al. | 280/701 |
| 3,573,882 | 4/1971 | Van Winsen | 280/690 |
| 4,159,123 | 6/1979 | Petty | 280/703 X |
| 4,421,332 | 12/1983 | Kosak et al. | 280/690 X |
| 4,437,678 | 3/1984 | Schultz | 280/703 X |
| 4,497,506 | 2/1985 | Miyakoshi et al. | 280/703 |

Primary Examiner—David M. Mitchell
Assistant Examiner—Charles R. Watts
Attorney, Agent, or Firm—Pollock, Vande Sande & Priddy

[57] ABSTRACT

A two-wheeled motor vehicle anti-lift device which utilizes the braking torque produced by the rear brake, via a link structure mechanism installed on the body of the vehicle, as anti-lift force. The anti-lift control mechanism produces anti-lift force only within a predetermined axle stroke range due to the fully extended position of the said link structure, and includes a crank member freely movable in the vehicle body frame, and having one end equipped with a roller which contacts the lower surface of the rear fork, while the other end is linked via a tension rod to a component sensitive to braking force which is freely movable about the wheel axle.

5 Claims, 5 Drawing Figures

TWO-WHEELED MOTOR VEHICLE ANTI-LIFT DEVICE

FIELD OF THE INVENTION

The present invention relates to an anti-lift device for a two-wheeled motor vehicle for the purpose of preventing lifting of the rear portion of the vehicle body frame upon braking.

BACKGROUND OF THE INVENTION

When braking is applied while a two-wheeled motor vehicle is in motion, due to the forward impetus of the center of gravity of the vehicle body resulting from inertia, the front part of the vehicle body tends to dive, while the rear part of the vehicle rises; this is known as the "tail lift" phenomenon.

Anti-lift devices, which make use of anti-lift force of the braking torque produced by the rear brake, transmitted through a link mechanism installed on the vehicle body, in order to prevent the occurrence of this phenomenon, are known in the art.

However, in prior art devices of this type, it has not been possible to obtain a satisfactory ride around the point at which the rear axle was fully extended due to the anti-lift function having been put into effect with respect to full axle stroke, or to get a satisfactory ride with the loss of stroke sensation from the middle to full inclination position. On the other hand, in a parallel link mechanism, the "tail lift" phenomenon cannot be prevented, but, in the range of full axle stroke, no effect is exerted upon the braking torque cushioning function, and a good stroke sensation can be obtained.

OBJECT OF THE INVENTION

The present invention effectively combines the advantageous features of a link type anti-lift mechanism and a parallel link mechanism, and its object is a two-wheeled motor vehicle anti-lift device made in such a way that, due to the inclusion of an anti-lift control mechanism which produces anti-lift force only within a predetermined axle stroke range due to the fully extended state of the link structure which is installed on the vehicle body, the anti-lift function takes effect near the point of full extension of the axle, while in the middle to full inclination positions, the mechanism operates as a parallel link structure, and a good ride is thus obtained in the full stroke range.

BRIEF INTRODUCTION TO THE DRAWINGS

In order that the invention may be more clearly understood, reference will now be made to the accompanying drawings, wherein an embodiment of the invention is shown for purposes of illustration, and wherein.

DESCRIPTION OF PREFERRED EMBODIMENT

Figure 1:
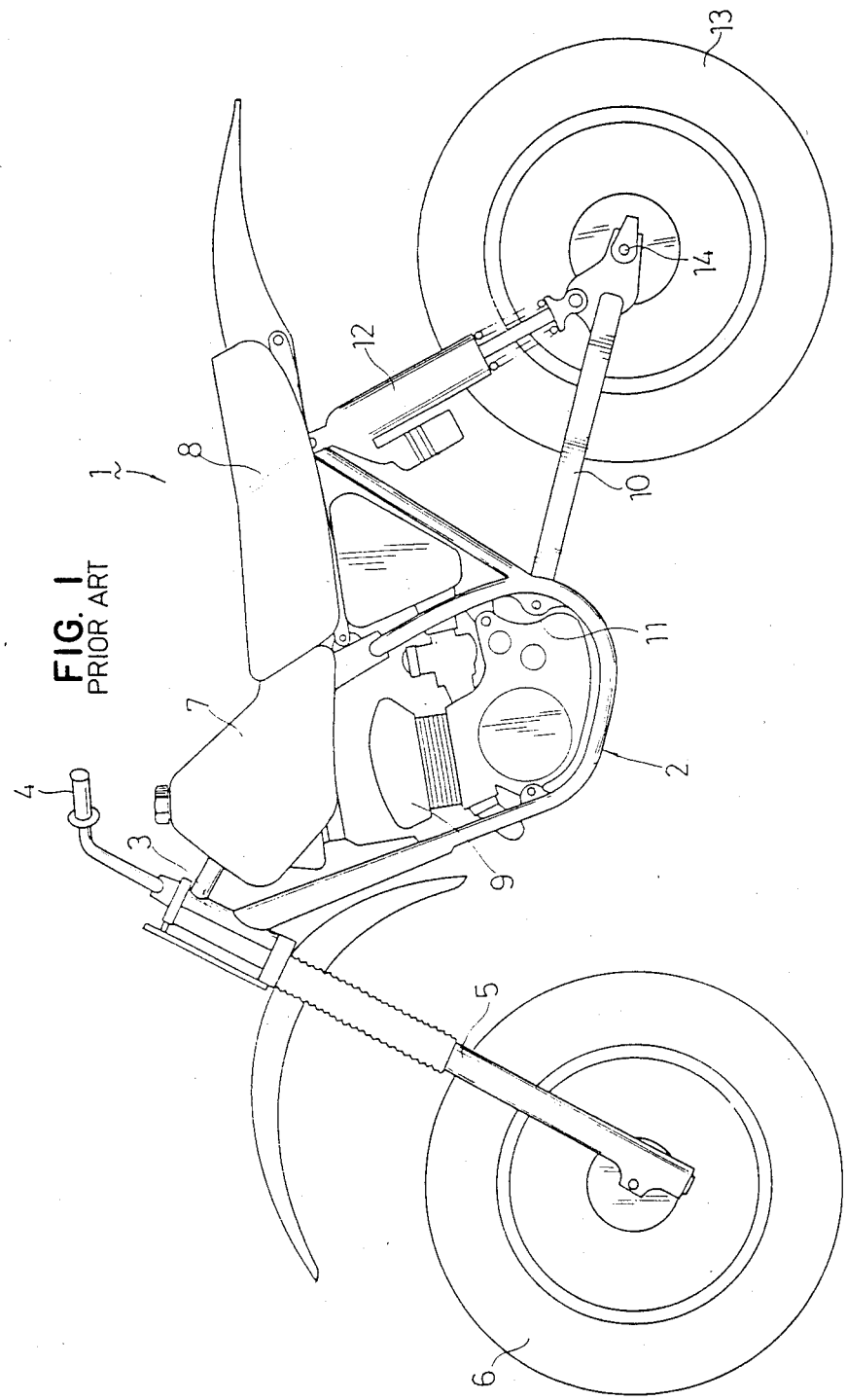
FIG. 1 is a full side view of a two-wheeled motor vehicle.

In the two-wheeled motor vehicle shown in FIG. 1, at the front end of the vehicle body frame 2 there is firmly fastened head pipe 3 through which a freely rotatable stem shaft (not shown in the figure) is inserted, a handle 4 being attached to the upper end of this head shaft. The upper end of front fork 5 is fastened to the stem shaft, and the lower end of the said front fork 5 straddles the front wheel 6, which serves as the forward operational wheel, placed so that it can rotate freely.

At the rear of the head pipe 3 are installed, respectively, fuel tank 7 and seat 8, and the engine 9 is housed below fuel tank 7.

At approximately the central lower area of vehicle body frame 2, the front end of rear fork 10 is connected by means of pivot shaft 11 for free up-and-down movement, the rear fork 10 is connected in frame suspension fashion by means of shock absorber 12 to the vehicle body frame 2, and at the rear end of rear fork 10, the rear wheel 13, which serves as the drive wheel, is contained, moving freely on rear axle 14.

Figure 2:
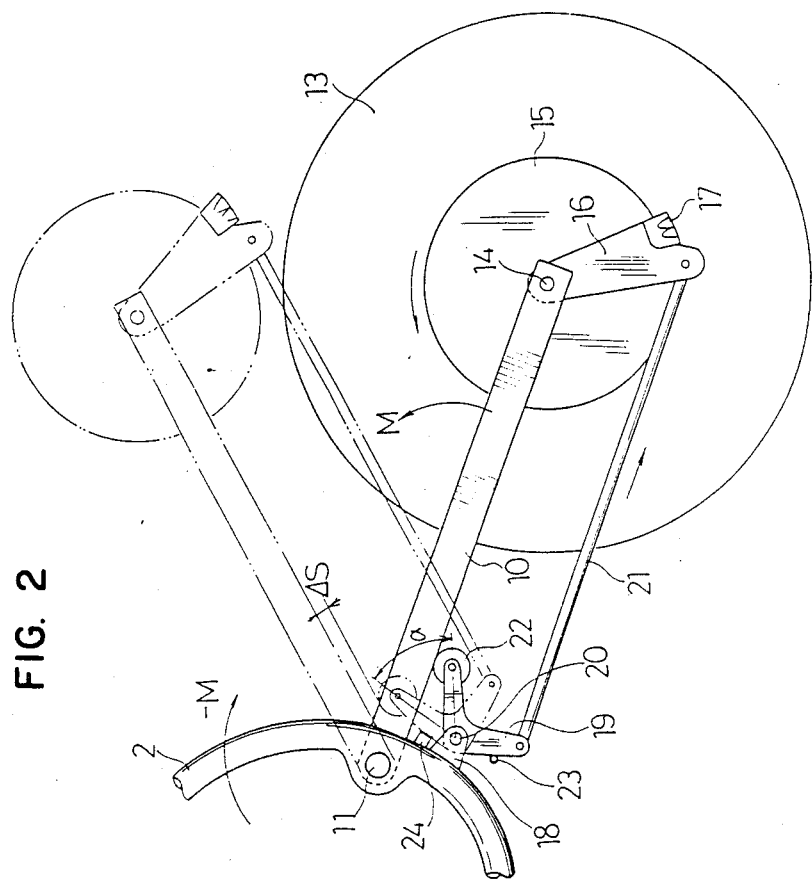
FIG. 2 is an enlarged side view of the rear part of said vehicle.

As shown in detail in FIG. 2, the cylindrical plate brake disc 15 is fastened on rear axle 14 for rotation as a unit, and caliper brackets 16 support the said rear axle 14 in the center so that it can rotate, while brake caliper 17 is fastened at the lower end of bracket 16. As for brake caliper 17, as is already known, upon operation of the brake pedal, pressurized oil forces a brake pad located in the same position against the brake disc 15, causing braking to occur.

On a bracket 18 fastened below pivot shaft 11 of the vehicle body frame 2, a generally L-shaped crank member 19 is attached by means of pin 20 and the lower end of crank number 19 is connected to caliper bracket 16 and connected by means of tension rod 21. In addition, at the upper end of this crank member 19, as shown in FIG. 2, roller 22 is installed in such a manner that it can turn freely, and the said roller 22, in the situation of full extension of rear axle 14, as shown by the solid lines in FIG. 2, through the operation of torsion spring 23, contacts the lower surface of rear fork 10.

At a point above bracket 18, there is installed a projecting stop 24, which controls the rotation of crank member 19, and the said stop 24, as shown in FIG. 2, allows the turning of crank member 19 only through angle $\alpha$. If the rear axle is fully inclined, as shown in chain-dotted lines in FIG. 2, the crank member contacts the stop 24, and at this point there is a set predetermined space $\Delta S$ between the rear fork 10 and the roller 22. The crank member 19 and the stop 24 are part of the anti-lift structure of the present invention.

When the two-wheeled motor vehicle is in motion, if pressure contact is applied to the brake disc 15, the brake calipers 17 having been actuated and the brake pads having been applied to the brake disc 15, due to the friction between the two contact surfaces, the said brake calipers 17 and the supporting caliper brackets 16 turn in the direction of rear wheel 13 mounted on rear axle 14, i.e., in the counterclockwise direction as seen in FIG. 2. Due to the counterclockwise rotation of rear caliper brackets 16, the tension rod 21 connected to one end of these at the bottom is drawn to the rear (the center right direction in FIG. 2), causing the crank member 19, pivoting on pin 20, to turn in the counterclockwise direction, as seen in FIG. 2. Consequently, the said crank member 19, via the roller 22 attached to its upper and, causes the rear fork 10, pivoting on shaft 11, to turn in a counterclockwise direction, as shown in FIG. 2.

As a result, a momentum M (shown by the arrow in FIG. 2) arises from the counterclockwise pivoting of rear fork 10 on shaft 11, giving rise to a resistance momentum −M, in balanced proportion to momentum M and of equal magnitude and opposite directional force, as shown by the clockwise arrow in FIG. 2. This resistnce momentum −M prevents the occurrence of the tail lift phenomenon referred to above, and even upon braking the vehicle body remains in stable condition, i.e., there is an anti-lift effect.

The above-described anti-lift effect takes place from a state of full extension within a predetermined axle stroke range, i.e., as shown in chain-dotted lines in FIG. 2, up to the point where the crank member 19 comes into contact with the stop 24, or, to put it another way, when roller 22 comes into contact with rear fork 10.

When crank member 19 has come into contact with stop 24, if the axle stroke is made even greater, the rear fork 10 is separated from the roller 22, a space ΔS is formed between the two, as shown in FIG. 2, and the anti-lift function is not put into effect, while the rear fork 10, the caliper brackets 16, the tension rod 21 and the crank member 19 assume the function of a parallel linked structure, and, as a result, in the range of axle central position to full inclination position, a good ride is obtained.

Figure 3:
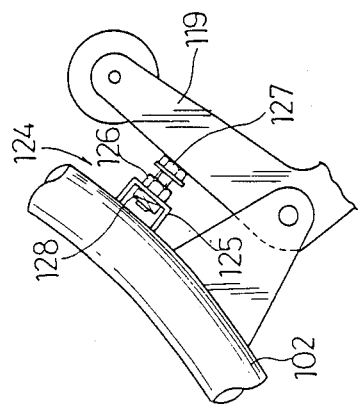
FIG. 3 is a side view showing means for adjustment of a stop member.

Since the range within which the anti-lift function is maintained can be varied in terms of the available turning angle of crank member 19, it can thus be adjusted, e.g., as shown in FIG. 3, by making the degree of projection of stop 124 variable. This is done, for example, by means of a nut 126 which is fixed onto channel member 125, which in turn is attached to vehicle body frame 102. A bolt 127 is screwed into nut 126, and, after appropriate setting of the degree of projection of bolt 127, when the latter is made fast by means of lock nut 126, it becomes possible to regulate the allowable turning angle α of crank member 19 as desired.

Figure 4:
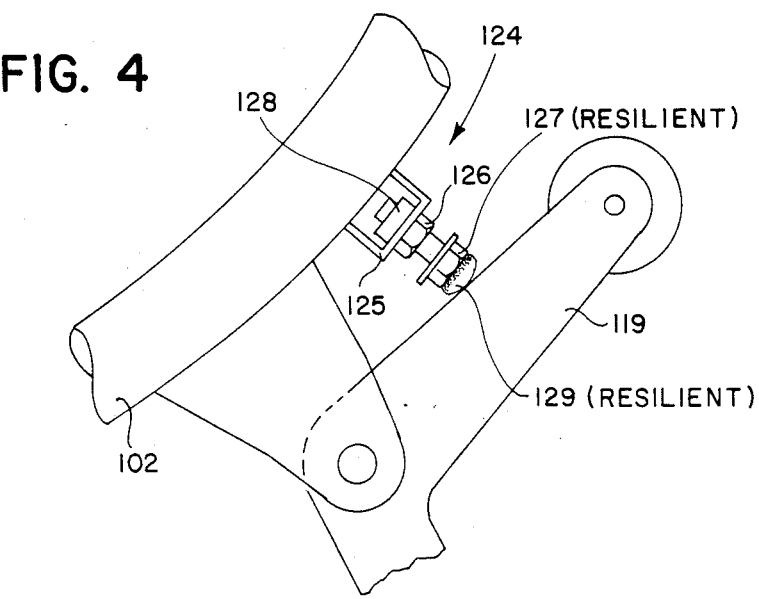
FIGS. 4 and 5 are side views similar to FIG. 3 showing variants of the stop member.
Figure 5:
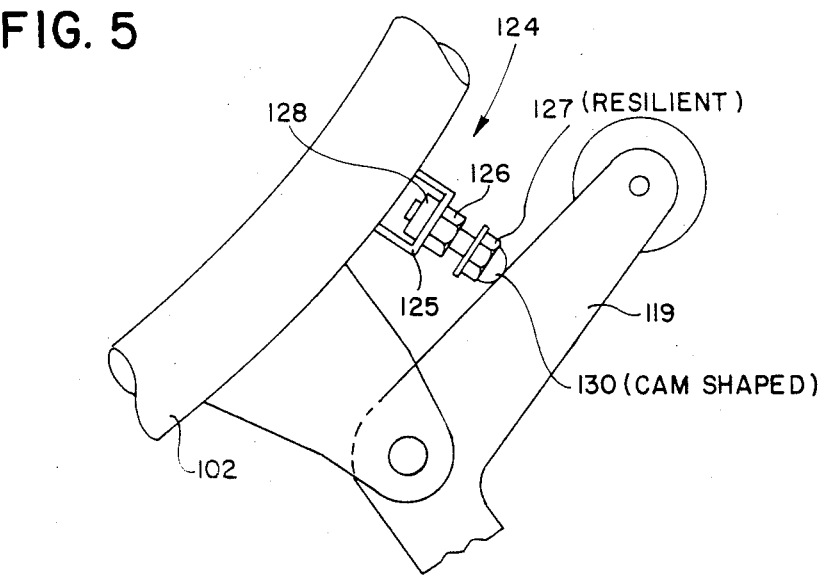

By attaching a resilient member 129 to the stop contact surface, or by constructing the contact surface (FIG. 4) as a cam 130 (FIG. 5), the shift from the anti-lift function to the parallel link function can be made smoothly.

As will be clear from the above explanation, in view of the anti-lift control structure which provides an anti-lift effect only in the range from full extension to a set axle stroke for the linkage structure installed on the vehicle body, the linkage structure provides an anti-lift function in the vicinity of full axle extension, while the middle and full inclination positions functions as a parallel linkage structure, so that a good ride is available in the entire stroke range.

What is claimed is:

1. An anti-lift device for a two wheeled motor vehicle having a body frame, a rear fork pivotally mounted at one end thereof on said body frame, a rear wheel mounted on an axle in said fork, and a rear brake, said device comprising a linkage structure located on said body frame, said linkage structure including a crank member rotatably supported on said body frame, means for bearing a braking torque produced by said rear brake upon braking, a tension rod connected between said torque bearing means and one end of said crank member for transmitting a braking force from said torque bearing means to said crank member thereby to move said crank member into contact with said rear fork and to cause said rear fork to be moved upwardly relative to said body frame, and a stop element for limiting the angular rotation of said crank member to within a predetermined angle, said device producing an anti-lift force only within a predetermined axle stroke range in a fully extended position of said linkage structure.

2. An anti dive device according to claim 1, wherein a second end of said crank member is provided with a roller which contacts a lower surface of said rear fork.

3. A anti dive device according to claim 1, and further comprising means for adjusting the extent of projection of said stop element from said body frame, wherein said stop element is mounted on and projects from said body frame for engagement by said crank member.

4. An anti dive device according to claim 3, wherein said stop element includes a resilient contact surface.

5. An anti dive device according to claim 3, wherein said stop element includes a cam-shaped contact surface.

* * * * *